United States Patent
Kanno et al.

(10) Patent No.: US 6,801,390 B2
(45) Date of Patent: Oct. 5, 2004

(54) STATIONARY HEAD TYPE MAGNETIC RECORDING/REPRODUCING SYSTEM WITH FLAT AND BEVEL SLIDE CONTACT SURFACES ON TRANSDUCIG HEAD

(75) Inventors: Kyu Kanno, Miyagi (JP); Yasuo Sugizaki, Kanagawa (JP)

(73) Assignee: Sony Corporation, Tokyo (JP)

( * ) Notice: Subject to any disclaimer, the term of this patent is extended or adjusted under 35 U.S.C. 154(b) by 122 days.

(21) Appl. No.: 10/171,118

(22) Filed: Jun. 13, 2002

(65) Prior Publication Data

US 2003/0021062 A1 Jan. 30, 2003

(30) Foreign Application Priority Data

Jun. 20, 2001 (JP) .................................... P2001-187204

(51) Int. Cl.[7] .............................................. G11B 5/187
(52) U.S. Cl. ...................................................... 360/122
(58) Field of Search ........................................ 360/122

(56) References Cited

U.S. PATENT DOCUMENTS

| | | | | |
|---|---|---|---|---|
| 4,888,657 A | * | 12/1989 | Lacey et al. | ................. 360/122 |
| 4,956,737 A | * | 9/1990 | Brock | ......................... 360/122 |
| 5,202,807 A | * | 4/1993 | Okada et al. | ................ 360/122 |
| 5,307,227 A | * | 4/1994 | Okada et al. | ................ 360/122 |

FOREIGN PATENT DOCUMENTS

JP          60124052 A   *   7/1985   ........... G11B/15/64

* cited by examiner

*Primary Examiner*—David Davis
(74) *Attorney, Agent, or Firm*—Sonnenschein, Nath & Rosenthal LLP (57) ABSTRACT

A stationary head type magnetic recording/reproducing system which includes a magnetic head responsible for recording/reproduction of signal to and from a running magnetic tape, and a pair of guides positioned on both sides of the magnetic head, the magnetic head having a flat slide-contact plane which comes into contact with the magnetic tape, and beveled planes at ends thereof.

14 Claims, 9 Drawing Sheets

STATIONARY HEAD TYPE MAGNETIC RECORDING/REPRODUCING SYSTEM WITH FLAT AND BEVEL SLIDE CONTACT SURFACES ON TRANSDUCIG HEAD

CROSS REFERENCES TO RELATED APPLICATIONS

The present document is based on Japanese Priority Document JP No. 2001-187204 filed in Japan on Jun. 20, 2001, and the entire contents of which being incorporated herein by reference.

BACKGROUND OF THE INVENTION

1. Field of the Invention

The present invention relates to a stationary head type magnetic recording/reproducing system comprising a magnetic head responsible for recording/reproduction of signal to and from a running magnetic tape, and a pair of guide means provided on both sides of the magnetic head.

2. Description of the Related Art

There has been a widely accepted way of performing magnetic recording/reproduction using a stationary head type magnetic recording/reproducing system (simply referred to as "stationary head system" hereinafter on occasion), in which magnetic tape runs on a fixed magnetic head.

Figure 18:
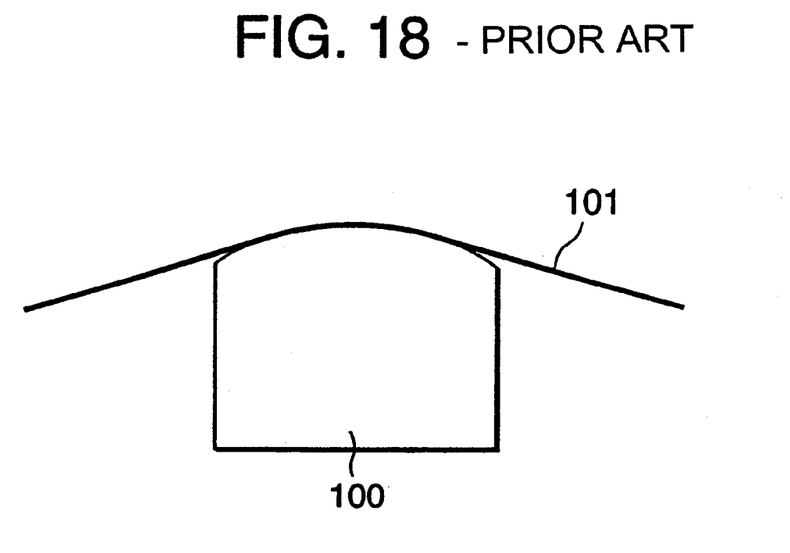
FIG. 18 is a side view showing a status of contact between a magnetic tape and a conventional magnetic head having a slide-contact plane curved in an arc form.

As shown in FIG. 18, a magnetic head 100 used for the stationary head system is positioned as being projected by a predetermined amount of projection towards a magnetic tape 101 which is stretched under a predetermined tension in order to ensure a proper contact therewith. The magnetic head 100 has a slide-contact plane which comes into contact with the magnetic tape 101, and the slide-contact plane is curved in an arc form along a direction of tape running so as to ensure a proper contact with the magnetic tape 101.

The proper contact herein means that only a small spacing is formed between the magnetic head and the magnetic tape during tape running, which successfully produces output large enough for recording/reproduction.

Recent demands for increased recording density raise a problem of increasing not only recording density of the magnetic tape but also transfer rate. To increase the transfer rate, it is indispensable to increase a relative speed between the magnetic head and the magnetic tape, which is generally referred to as a tape speed.

An increased tape speed in the stationary head system using the magnetic head having such a curved slide-contact plane, however, undesirably increases spacing between the magnetic head and the magnetic tape, which degrades contact of the both to thereby cause irregular output. A reason for such degraded contact for the magnetic head having the curved slide-contact plane will be explained below referring to FIG. 19.

Figure 19:
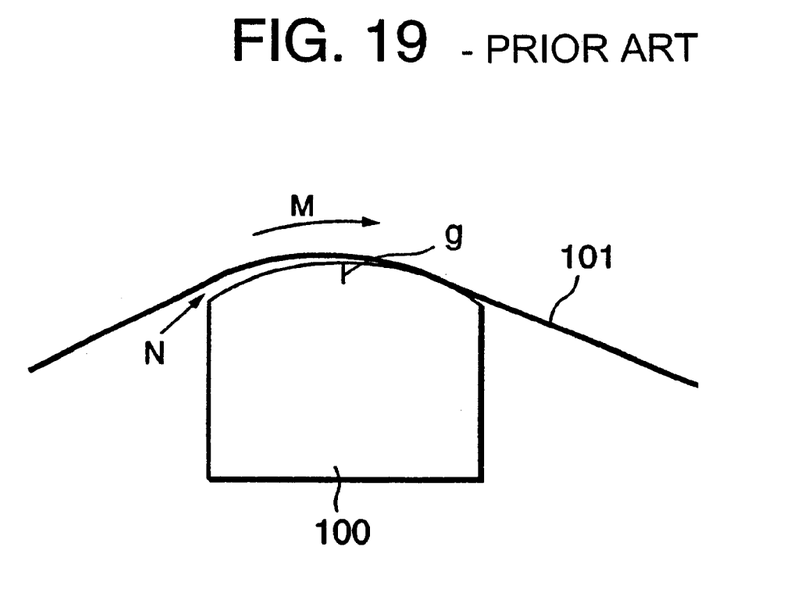
FIG. 19 is a side view showing a running status of a magnetic tape on the magnetic head shown in FIG. 18.

FIG. 19 shows the magnetic tape 101 running on the magnetic head 100 in a direction of an arrow M, where the magnetic head 100 has a curved slide-contact plane and a gap g approximately at the center thereof along a running direction of the magnetic tape 101. When the magnetic tape 101 runs, an air flow generated in the vicinity of the magnetic tape 101 flows into a spacing between the magnetic tape 101 and the slide-contact plane of the magnetic head 100 as indicated by an arrow N in FIG. 19, so that thickness of an air layer flowing between the magnetic tape 101 and the magnetic head 100 increases. This widens the spacing between the gap g of the magnetic head 100 and the magnetic tape 101 to thereby cause irregular output.

Volume of the entrained air increases as the tape speed increases, so that the problem of the irregular output will become more serious in the stationary head system using the conventional magnetic head 100.

In other words, degradation of spacing characteristic between the magnetic head and the magnetic tape makes a cause for preventing the magnetic recording/reproducing system from being improved in the recording density.

SUMMARY OF THE INVENTION

The present invention is proposed considering the conventional situation and provides a stationary head type magnetic recording/reproducing system capable of attaining high recording density while successfully ensuring a proper contact between a magnetic tape and a magnetic head.

In one aspect of the present invention, a stationary head type magnetic recording/reproducing system comprises a magnetic head responsible for recording/reproduction of signal to and from a running magnetic tape; and a pair of guide means provided in a depth-wise direction and on both sides of the magnetic head. The magnetic head has a flat slide-contact plane which comes into contact with the magnetic tape, and performs recording/reproduction of signal while pressurizing the magnetic tape which runs as being guided by the guide means.

In thus composed stationary head type magnetic recording/reproducing system, the magnetic head is positioned so that the slide-contact plane thereof presses a magnetic tape which is stretched between a pair of guide means, and has a flat slide-contact plane. The stationary head magnetic recording/reproducing system can block air entrainment into a space between the slide-contact plane and the magnetic tape during tape running, which desirably reduces spacing during the tape running. Accordingly, the present invention can successfully provide a stationary head type magnetic recording/reproducing system capable of ensuring stable signal recording/reproduction while successfully ensuring a proper contact between the magnetic tape and the magnetic head.

Thus composed stationary head type magnetic recording/reproducing system is also advantageous in that the spacing between the magnetic head and the magnetic tape becomes smaller as the tape speed grows faster. Accordingly, the present invention can successfully provide a stationary head type magnetic recording/reproducing system capable of attaining high recording density while successfully ensuring a proper contact between the magnetic tape and the magnetic head.

In another aspect of the present invention, a stationary head type magnetic recording/reproducing system comprises a magnetic head responsible for recording/reproduction of signal to and from a magnetic tape running unidirectionally; a first guide means provided in a depth-wise direction on a tape enter side of the magnetic head; and a second guide means provided in the depth-wise direction on a tape exit side of the magnetic head. The magnetic head has a flat slide-contact plane which comes into contact with the magnetic tape, and performs recording/reproduction of signal while pressurizing the magnetic tape which runs as being guided by the first and second guide means. The magnetic head also has a bevel plane at an end of the slide-contact plane on the tape enter side.

In thus composed stationary head type magnetic recording/reproducing system, the magnetic head is positioned so that the slide-contact plane presses a magnetic tape which is stretched between a pair of guide means to thereby bend the magnetic tape towards the depth-wise direction on the tape enter side. The magnetic head has a flat slide-contact plane and a bevel plane at the end thereof on the tape enter side. The stationary head magnetic recording/reproducing system can block the air entrainment into the space between the slide-contact plane and the magnetic tape during tape running, which desirably reduces the spacing during the tape running. This is also advantageous in that dispersing contact pressure between the magnetic tape and the magnetic head, to thereby reduce damages of the magnetic tape and suppress the deformation of the magnetic head due to abrasion. Accordingly, the present invention can successfully provide a stationary head type magnetic recording/reproducing system capable of ensuring stable signal recording/reproduction while successfully ensuring a proper contact between the magnetic tape and the magnetic head.

Thus composed stationary head type magnetic recording/reproducing system is still also advantageous in that the spacing between the magnetic head and the magnetic tape becomes smaller as the tape speed grows faster. Accordingly, the present invention can successfully provide a stationary head type magnetic recording/reproducing system capable of attaining high recording density while successfully ensuring a proper contact between the magnetic tape and the magnetic head.

In still another aspect of the present invention, a stationary head type magnetic recording/reproducing system comprises a first magnetic head and a second magnetic head responsible for recording/reproduction of signal to and from a running magnetic tape; and a pair of guide means provided in a depth-wise direction and at sides of the first and second magnetic heads other than those facing each other. Each of the first and second magnetic heads has a flat slide-contact plane which comes into contact with the magnetic tape, and has a bevel plane at a corner between the slide-contact plane and a side plane facing each of the guide means.

In thus composed stationary head type magnetic recording/reproducing system, the first and second magnetic heads are positioned so that the slide-contact planes thereof press a magnetic tape which is stretched between a pair of guide means. The first and second magnetic heads respectively have a flat slide-contact plane and a bevel plane at an end thereof on a side the respective guide means are provided. The stationary head magnetic recording/reproducing system can block the air entrainment into a space between the slide-contact planes of the first/second magnetic heads and the magnetic tape during tape running, which desirably reduces spacing during the tape running. This is also advantageous in that dispersing contact pressure between the magnetic tape and the first/second magnetic heads, to thereby reduce damages of the tape and suppress the deformation of the first and second magnetic heads due to abrasion. Accordingly, the present invention can successfully provide a stationary head type magnetic recording/reproducing system capable of ensuring stable signal recording/reproduction while successfully ensuring a proper contact between the magnetic tape and the magnetic head.

Thus composed stationary head type magnetic recording/reproducing system is still also advantageous in that the spacing between the first/second magnetic heads and the magnetic tape becomes smaller as the tape speed grows faster. Accordingly, the present invention can successfully provide a stationary head type magnetic recording/reproducing system capable of attaining high recording density while successfully ensuring a proper contact between the magnetic tape and the magnetic head.

BRIEF DESCRIPTION OF THE DRAWINGS

The above and other objects, features and advantages of the present invention will become more apparent from the following description of the presently preferred exemplary embodiment of the invention taken in conjunction with the accompanying drawings, in which.

DETAILED DESCRIPTION OF THE PREFERRED EMBODIMENTS

The stationary head type magnetic recording/reproducing system (simply referred to as "stationary head system"

hereinafter on occasion) according to the present invention will be detailed referring to the attached drawings. The description herein will deal with an example in which the present invention is applied to a so-called reel-to-reel type stationary head system. In such a reel-to-reel system, take-up portions of a magnetic tape are exposed to the external.

It should now be noted that, although the following description deals with a reel-to-reel type stationary head system, the present invention is by no means limited thereto. The present invention is applicable to any kind of systems provided that they are magnetic recording/reproducing systems in which signal recording and reproduction is made effective while keeping a magnetic head in a fixed state.

Figure 1:
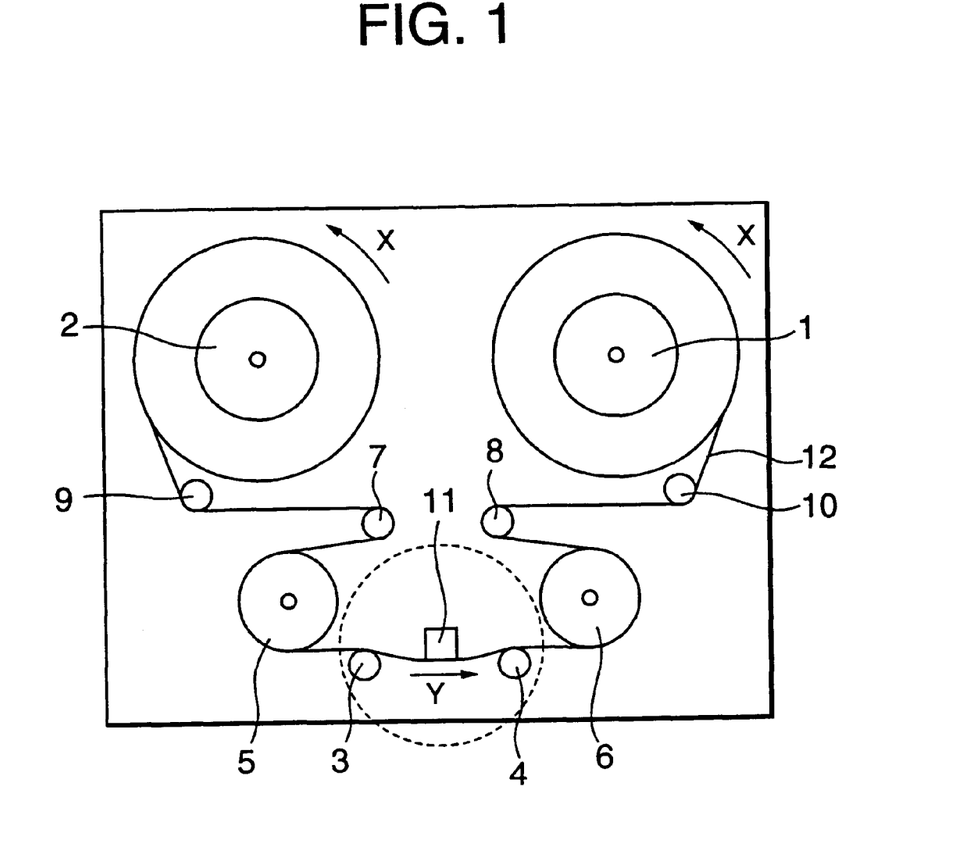
FIG. 1 is a plan view of a stationary head type magnetic recording/reproducing system of a reel-to-reel type.

The stationary head system according to the present invention comprises, as shown in FIG. 1, a rotatable take-up reel 1, a feed reel 2, guides 3, 4, 5, 6, 7, 8, 9 and 10 as guide means, and a magnetic head 11 provided in a fixed state. A magnetic tape 12 runs between the take-up reel 1 and the feed reel 2.

The take-up reel 1 and the feed reel 2 are wound with the magnetic tape 12 in a large number of turns, where the magnetic tape 12 is stretched between both reels under a predetermined tension. The take-up reel 1 shown in FIG. 1 is responsible for taking-up of the magnetic tape 12, and the feed reel 2 is responsible for feeding thereof. Rotation of both of the take-up reel 1 and the feed reel 2 can be inverted.

The guides 3 to 10 are responsible for guiding the magnetic tape 12, between the take-up reel 1 and the feed reel 2, from the feed reel 2 to the magnetic head 11, and from the magnetic head 11 to the take-up reel 1, to thereby stabilize tape running.

Figure 2:
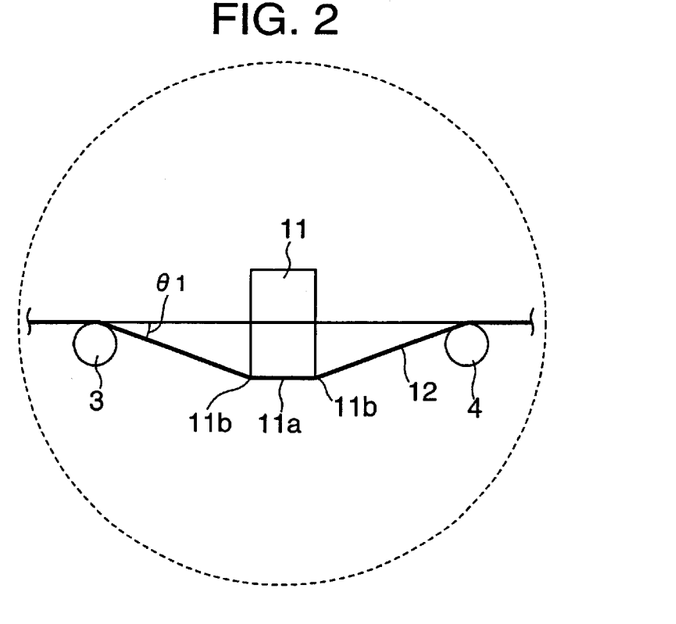
FIG. 2 is an enlarged view of an area surrounded by a broken line in FIG. 1.

The magnetic head 11 is arranged so that a slide-contact plane thereof 11a presses a major surface of the magnetic tape stretched between the guides 3 and 4, as shown in FIG. 2. That is, the magnetic head 11 is placed so as to bend the magnetic tape 12 on both sides thereof towards a depth-wise direction of the magnetic head 11. The magnetic head 11 has the flat slid-contact plane 11a which comes into contact with the magnetic tape 12, and has edge portions 11b at both edges of the slide-contact plane 11a along the running direction of the magnetic tape 12 (referred to as "tape run direction" hereinafter). Note that FIG. 2 is an enlarged view of the magnetic head 11 and peripheral area thereof shown in FIG. 1.

The magnetic tape 12 under a predetermined tension deforms so as to be aligned in a forced manner with the slide-contact plane 11a of the magnetic head 11 by a predetermined angle of projection $\theta_1$ where the edge portions 11b serve as fulcrums, to thereby ensure a proper contact state with the magnetic head 11.

The angle of projection $\theta_1$ herein is defined as an acute angle out of angles formed between the slide-contact plane 11a and the magnetic tape 12 stretched typically between the slide-contact plane 11a and the guide 3.

It should be noted that FIG. 2 assumes for the simplicity of explanation that a line connecting the guides 3 and 4, which are the guide means most close to the magnetic head 11, is parallel to the slide-contact plane 11a, and defines an acute angle out of angles formed between the line connecting the guides 3, 4 and the magnetic tape 12 extending towards the magnetic head 11 as the angle of projection $\theta_1$.

The angle of projection $\theta_1$ is determined considering various elements composing the stationary head system, and typically optimized according to dimensions of the magnetic head 11, positions of the individual guides for guiding running of the magnetic tape 12, and other design rules of the system.

Signal recording and reproduction using such a stationary head system are made effective by rotating the take-up reel 1 and the feed reel 2 in a direction indicated by an arrow X while being driven by motors not shown, to thereby make the magnetic tape 12 run between the take-up reel 1 and the feed reel 2. In this case, the magnetic tape 12 run out of the feed reel 2 is successively guided by the guides 9, 7, 5 and 3, and allowed to run on the slide-contact plane 11a of the magnetic head 11 in a direction indicated by an arrow Y. The magnetic tape 12 is then successively guided by the guides 4, 6, 8, and 10, and taken up by the take-up reel 1.

In the stationary head system according to the present invention, the magnetic head 11 is placed so that the slide-contact plane 11a thereof presses the magnetic tape 12, and the slide-contact plane 11a of the magnetic head 11 is flat as has been described in the above, so that contact pressure is generated between the magnetic tape 12 and the edge portions 11b of the magnetic head 11. When the magnetic tape 12 runs in the stationary head magnetic recording/reproducing system, the edge portions 11b can successfully block the air entrained into the space between the slide-contact plane 11a and the magnetic tape 12, and flatness of the slide-contact plane 11a contributes to thinning of an air layer entrained between the slide-contact plane 11a of the magnetic head 11 and the magnetic tape 12. This allows the magnetic tape 12 to run while minimizing the spacing between the slide-contact plane 11a of the magnetic head 11 and the magnetic tape 12. Accordingly, the stationary head type magnetic recording/reproducing system can ensure stable signal recording/reproduction without causing irregular output while keeping a proper contact between the magnetic tape 12 and the magnetic head 11.

The stationary head system described in the above has a tendency of thinning the air layer as the tape speed increases, and of improving the contact status of the magnetic tape 12 and the magnetic head 11. Accordingly, the present invention can raise a transmission rate by increasing the tape speed, which enables building of a stationary head system with a high recording density.

The foregoing stationary head system is preferably designed to allow the magnetic tape 12 to run both in forward and reverse directions. This enables recording in a doubled volume as compared with that of a conventional stationary head system allowing only a unidirectional tape running. Accordingly, the present invention can achieve increase both in the transmission rate and the recording capacity of the magnetic tape at the same time, to thereby build a stationary head system never found before. Note that in a stationary head system in which the magnetic tape 12 can run also in the reverse direction, the take-up reel 1 also serves as the feed reel 2, and vice versa.

Following paragraphs will describe evidences for advantage of the magnetic head, having a flat slide-contact plane, employed by the stationary head system of the present invention over the magnetic head, having a curved slide-contact plane, employed by the conventional stationary head system, based on simulation results.

A simulation was carried out to investigate spacing behavior of the stationary head system of the present invention provided with a magnetic head having a flat slide-contact plane (referred to as "flat head" hereinafter) while setting a tape speed within a range from 1 to 10 m/sec.

Another simulation was also carried out to investigate spacing behavior of a conventional stationary head system provided with a magnetic head having a curved slide-contact plane (referred to as "cylindrical head" hereinafter) while setting a tape speed within a range from 1 to 10 m/sec. As for the slide-contact plane of the cylindrical head, a radius of curvature in the tape run direction was set to 10 mm.

Figure 3:
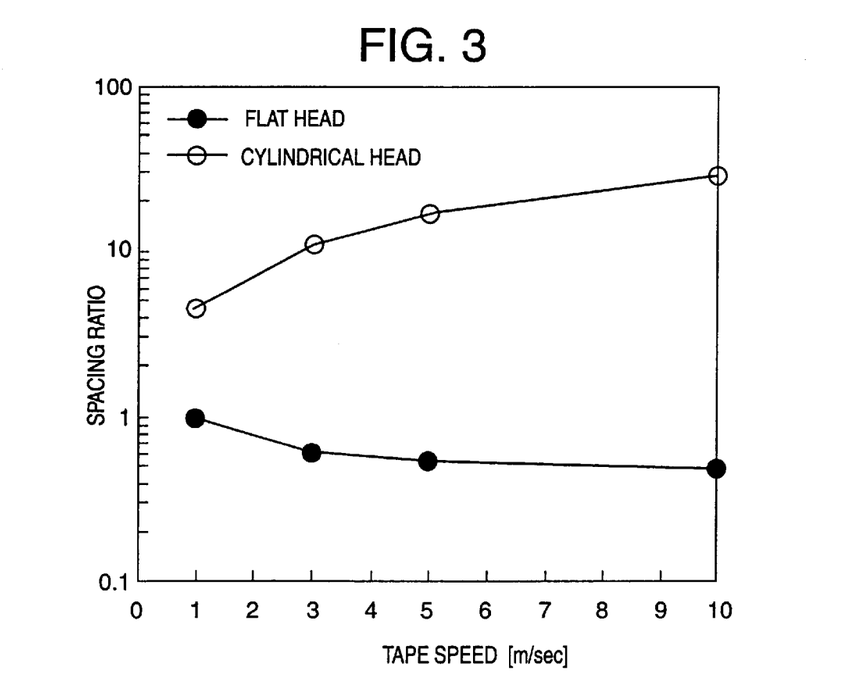
FIG. 3 is a graph showing simulation results of spacing behaviors depending on tape speed for individual models of a conventional stationary head type system and a stationary head type according to the present invention.

Spacing characteristic revealed by the simulation is shown in FIG. 3. Note that the results of spacing shown in FIG. 3 are expressed by a ratio assuming an amount of spacing observed when the magnetic tape is running at a speed of 1 m/sec as 1.

As is clear from FIG. 3, the flat head showed a decreasing tendency in the spacing as the tape speed increases within a range from 1 to 3 m/sec. A proper contact between the magnetic head and the magnetic tape was also retained even at a higher tape speed exceeding 3 m/sec without causing increase in the spacing.

On the contrary, the cylindrical head showed an increasing tendency in the spacing as the tape speed increases.

From the simulation results above, the magnetic head having the flat slide-contact plane was found to successfully suppress the spacing between the magnetic tape and magnetic head even when the tape speed was raised, to thereby ensure a proper contact state. Accordingly, it was made clear that the present invention can raise the transfer rate without causing irregular output, and thus can build up a stationary head system capable of achieving a high recording density.

It was also found that a tape speed as fast as 1 m/sec or above is preferable for the stationary head system according to the present invention, and a tape speed as fast as 3 m/sec or above is more preferable in view of suppressing the spacing.

In the stationary head system shown in FIG. 1, the edge portions 11b block the air entrained between the magnetic tape 12 and the slide-contact plane 11a of the magnetic head 11 during the tape running, and the flatness of the slide-contact plane 11a contributes to reduction in the spacing during the tape running. Accordingly, the stationary head system can ensure stable signal recording/reproduction while keeping a proper contact between the magnetic tape 12 and the magnetic head 11.

The stationary head type magnetic recording/reproducing system shown in FIG. 1 is also advantageous in that the spacing between the magnetic head 11 and the magnetic tape 12 becomes smaller as the tape speed grows faster. Accordingly, the present invention can successfully achieve a high recording density while keeping a proper contact between the magnetic head 11 and the magnetic tape 12.

Another example of the stationary head system according to the present invention will be described in the following paragraphs.

Figure 4:
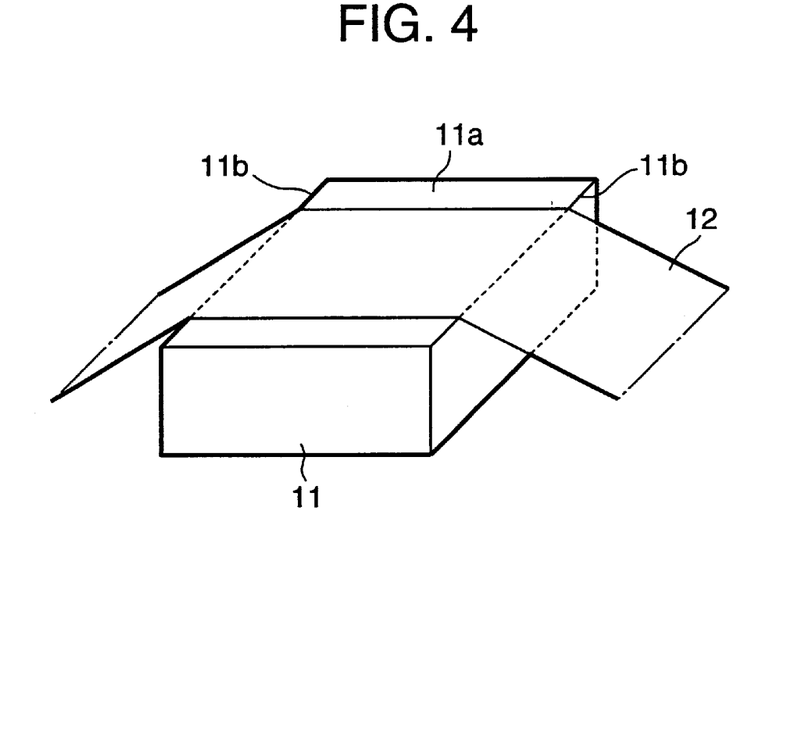
FIG. 4 is a perspective view showing a status of contact between a magnetic tape and a magnetic head having a flat slide-contact plane.
Figure 5:
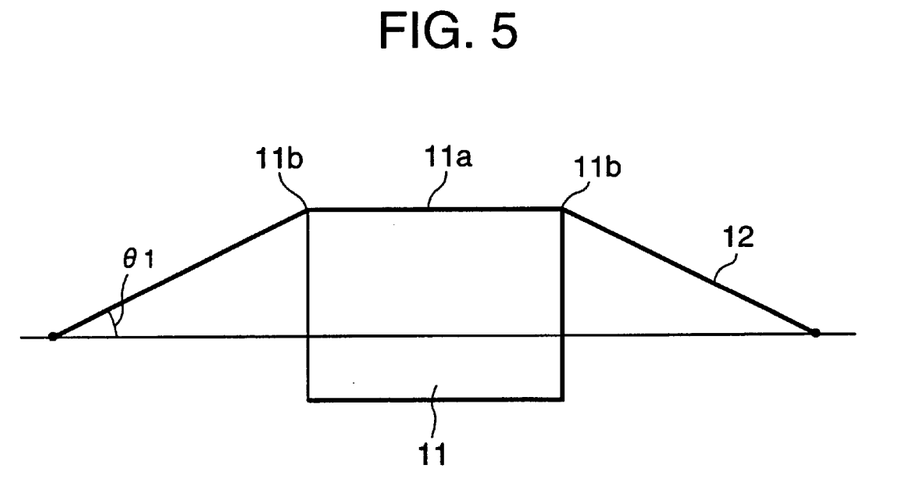
FIG. 5 is a side view showing the status of contact between the magnetic tape and the magnetic head having the flat slide-contact plane.

As has been described in the above, the stationary head system of the present invention employs the magnetic head 11 having the flat slide-contact plane 11a, where the edge portions 11b of the magnetic head 11 prevents the air from being entrained between the slide-contact plane 11a and the magnetic tape 12, which always ensures a proper contact status even under a fast tape speed. Since the magnetic tape 12 is set so as to have a predetermined angle of projection $\theta_1$ as shown in FIGS. 4 and 5, the magnetic tape 12 deforms around the edge portions 11b which serve as fulcrums. More specifically, the magnetic tape 12 comes into line contact with the magnetic head 11 at the edge portions 11b in a width-wise direction, and comes into point contact therewith in a longitudinal direction.

Contact pressure applied to the magnetic tape 12 however locally increases at the edge portions 11b where the magnetic head 11 and the magnetic tape 12 come into line contact in the width-wise direction. Accordingly, the magnetic tape 12 will continuously be applied with a large pressure from the edge portions 11b during the tape running, which is causative of damage on the tape.

Therefore the magnetic head is preferably shaped so as to have a flat slide-contact plane and bevel planes at both ends of the slide contact plane along a running direction of the magnetic tape, which are obtained by chamfering the edges of the head. This will successfully disperse contact pressure applied to the magnetic tape and reduce the damage. This is also advantageous in suppressing deformation of the magnetic head due to abrasion.

Figure 6:
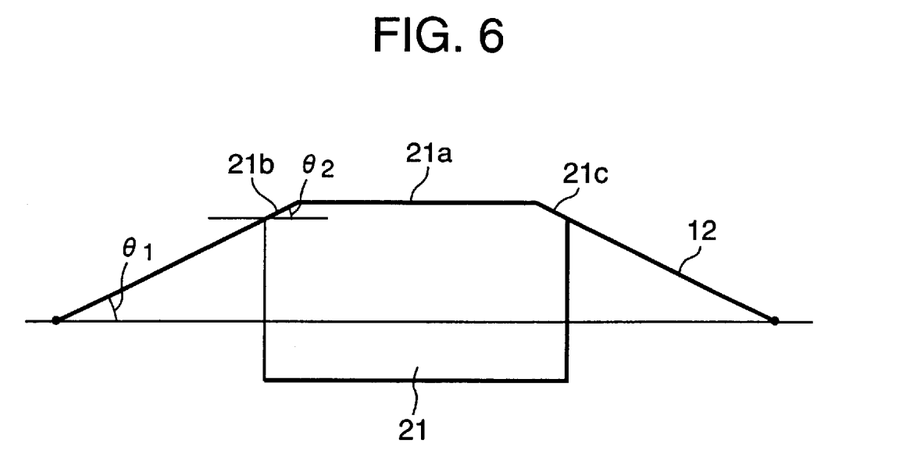
FIG. 6 is a side view showing a status of contact between a magnetic tape and a magnetic head having a flat slide-contact plane and a bevel plane at both ends thereof along a running direction of the magnetic tape.

In specific, as shown in FIG. 6, a magnetic head 21 preferably has a flat slide-contact plane 21a and flat bevel planes 21c at both ends of the slide-contact plane 21a along the tape run direction. The magnetic head 21 having such flat bevel planes 21c will successfully disperse contact pressure applied to the magnetic tape 12 to thereby reduce damage on the tape. This is also advantageous in suppressing deformation of the magnetic head 21 due to abrasion.

In the following description, the elements equivalent to those in the stationary head type magnetic recording/reproducing system previously shown in FIG. 1 will not be detailed, and may not be illustrated in the drawings.

An angle between the bevel planes 21c and the slide-contact plane 21a has an optimum range. More specifically, assuming an acute angle out of angles formed between the slide-contact plane 21a and the bevel planes 21c as an angle of inclination $\theta_2$, the angle of inclination $\theta_2$ is preferably within a range exceeding 70% and less than 300% of an angle of projection $\theta_1$.

By forming the bevel planes 21c so that the angle of inclination $\theta_2$ will fall within the above range in the magnetic head 21 having the flat slide-contact plane 21a, the contact pressure applied to the magnetic tape 12 will be dispersed while keeping a proper spacing characteristic, which results in reduced tape damage. Deformation of the magnetic head 21 due to abrasion will also be suppressed. On the contrary, the angle of inclination $\theta_2$ of 70% or less of the angle of projection $\theta_1$ may be causative of the tape damage, and the angle of inclination $\theta_2$ of 300% or more may result in only a limited effect of reducing the tape damage.

A simulation was then carried out to investigate the contact pressure and spacing behaviors of the stationary head system provided with a magnetic head having the flat slide-contact plane and the flat bevel planes at both ends thereof along the tape run direction, while setting an angle of projection $\theta_1$ of 2°, a tape speed of 3 m/sec, and an angle of inclination $\theta_2$ of the bevel planes ranging from 0° to 6°.

Figure 7:
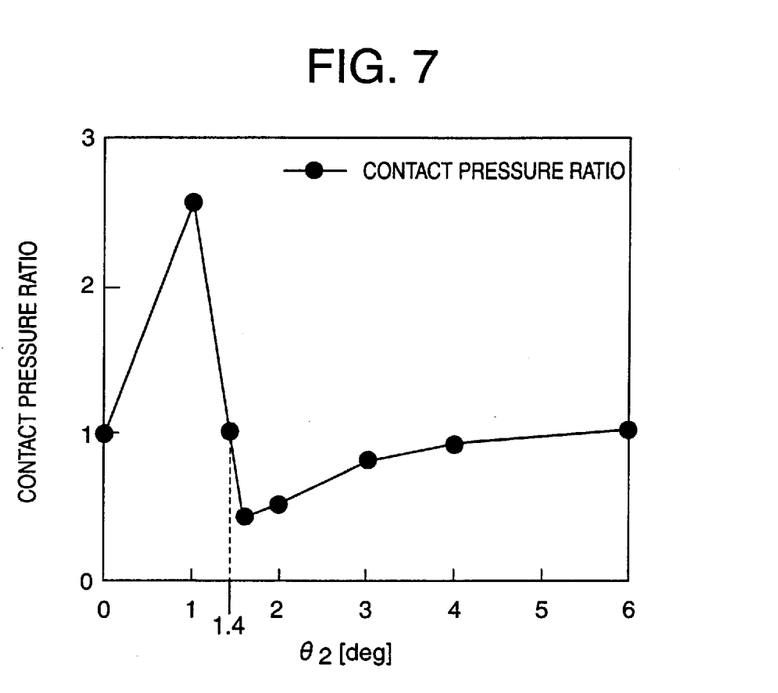
FIG. 7 is a graph showing a simulation result of behavioral characteristic of contact pressure depending on an angle of inclination of the bevel plane.
Figure 8:
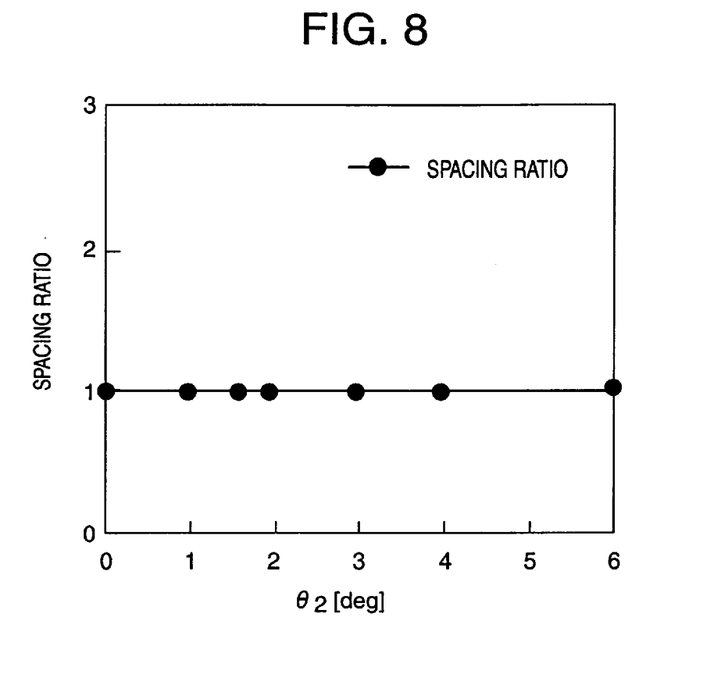
FIG. 8 is a graph showing a simulation result of behavioral characteristic of spacing ratio depending on the angle of inclination of the bevel plane.

Contact pressure and spacing behaviors are shown in FIGS. 7 and 8, respectively. Note that the results shown in FIGS. 7 and 8 are expressed by a ratio assuming the contact pressure and spacing observed for the magnetic head having no bevel planes ($\theta_2=0°$) as 1, respectively.

As clearly known from FIG. 7, the stationary head system having an angle of inclination $\theta_2=1°$ undesirably resulted in an increased contact pressure as compared with that for a case with no bevel planes ($\theta_2=0°$). The contact pressure, however, sharply decreased as the angle of inclination $\theta_2$ approaches 2° which is equivalent to the angle of projection $\theta_1$, then reached a level equivalent to that for the case with no bevel planes at $\theta_2=1.4°$, and reached minimum at $\theta_2=1.6°$. Although the contact pressure gradually increased again with further increase in the angle of inclination $\theta_2$, it was kept smaller than that for the case with no bevel planes before $\theta_2=6°$ is attained.

The foregoing angle of inclination $\theta_2=1.4°$ can also be expressed as 70% of the angle of projection $\theta_1=2°$, and $\theta_2=6°$ as 300%.

As is clear from FIG. 8 showing results of the spacing, the spacing was kept constant even when the angle of inclination $\theta_2$ was increased. It was thus confirmed from the results that a desirable spacing is attainable also when flat bevel planes are provided to a magnetic head having a flat slide-contact plane.

Figure 9:
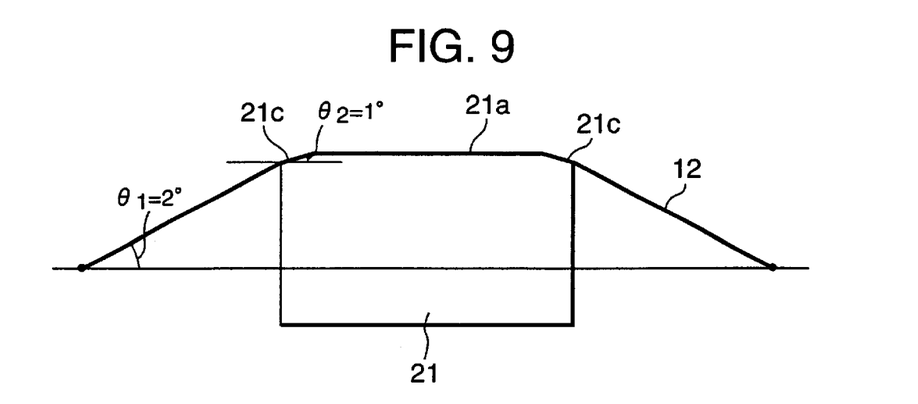
FIG. 9 is a side view showing a status of contact between a magnetic tape and a magnetic head having a flat bevel plane and having an angle of inclination $\theta_2$ of 1°.
Figure 10:
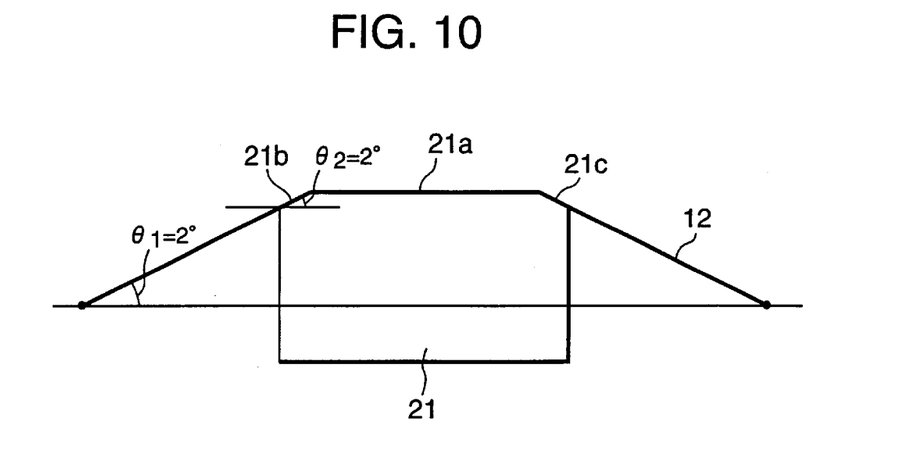
FIG. 10 is a side view showing a status of contact between a magnetic tape and a magnetic head having a flat bevel plane and having an angle of inclination $2\theta$ of 2°.

Of the models of magnetic head simulated in the above, that having an angle of inclination $\theta_2$ of 1° and that having an angle of inclination $\theta_2$ of 2° are shown together with their peripherals in an enlarged manner in FIGS. 9 and 10, respectively.

It is known from FIG. 10 that, when the angle of inclination $\theta_2$ is set to 2°, a deformation profile of the magnetic tape 12 approximately coincides with the profile of the bevel plane 21c. It was thus supposed that the magnetic tape 12 and the magnetic head 21 came into planar contact at both ends of the head in the tape run direction, to thereby lower the contact pressure.

On the contrary, a reason why the contact pressure rose when the angle of inclination $\theta_2$ was set to 1° is supposed that, as known from FIG. 9, the magnetic head 21 and the magnetic tape 12 came into line contact at two sites, that is, both ends of the magnetic head 21 along the tape run direction. It is thus considered that the magnetic head 21 provided with the bevel planes 21c having an angle of inclination $\theta_2$ of 1° was causative of increase in the contact pressure as compared with a magnetic head having no bevel planes.

From such investigation results, it was made clear that damage on the magnetic tape 12 can further be reduced while ensuring a proper contact between the magnetic head 21 and the magnetic tape 12, and that the magnetic tape 12 can be improved in durability, if the flat bevel planes 21c are provided so that the angle of inclination $\theta_2$ falls within a range exceeding 70% and less than 300% of the angle of projection $\theta_1$.

The magnetic head 21 having the flat slide-contact plane 21a and the flat bevel planes 21c as shown in FIG. 6 can be fabricated by chamfering the edge portions 11b of the magnetic head 11 having the flat slide-contact plane 11a as shown in FIG. 5. It is also allowable that the magnetic head 21 having flat bevel planes 21c can preliminarily be fabricated in an integrated manner by molding so that the flat bevel planes 21c are formed on both sides of the flat slide-contact plane 21a. It is still also allowable that the magnetic head 21 having the flat bevel planes 21c can be fabricated by bonding the magnetic head 11 having an approximately rectangular shape as shown in FIG. 5 and a pair of units having planes corresponded to the flat bevel planes 21c, so that the magnetic head 11 is held at both sides of the edge portions 11b by the pair of units.

In the stationary head system shown in FIG. 6, air entrainment into the space between the slide-contact plane 21a of the magnetic head 21 and the magnetic tape 12 during tape running can be blocked by the bevel planes 21c, and the spacing during the tape running is minimized by the flatness of the slide-contact plane 21a. Moreover, provision of the flat bevel planes 21c at both ends of the slide-contact plane 21a along the tape run direction is advantageous in that dispersing the contact pressure between the magnetic tape 12 and the magnetic head 21, which reduces damages on the tape and suppresses deformation of the magnetic head 21 due to abrasion. Accordingly, the stationary head system can ensure stable signal recording/reproduction while successfully ensuring a proper contact between the magnetic head 21 and the magnetic tape 12.

The stationary head type magnetic recording/reproducing system shown in FIG. 6 is also advantageous in that the spacing between the magnetic head 21 and the magnetic tape 12 becomes smaller as the tape speed grows faster. Accordingly, the stationary head system can attain high recording density while successfully ensuring a proper contact between the magnetic head 21 and the magnetic tape 12.

A still another example of the stationary head system according to the present invention will be described in the following paragraphs.

Figure 11:
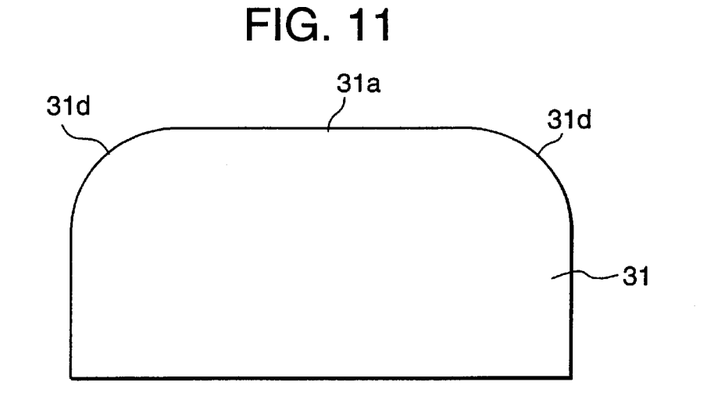
FIG. 11 is a side view of a magnetic head having a flat slide-contact plane and curved bevel planes at both ends thereof along the running direction of magnetic tape.

In a specific example shown in FIG. 11, a magnetic head 31 preferably has a flat slide-contact plane 31a and curved bevel planes 31d at both ends of the slide-contact plane 31a along the tape run direction. The stationary head system provided with the magnetic head 31 having the flat slide-contact plane 31a and curved bevel planes 31d will successfully disperse contact pressure applied to the magnetic tape 12 to thereby reduce damage on the tape. This is also advantageous in suppressing deformation of the magnetic head 31 due to abrasion.

It is to be noted that lower contact pressure between the magnetic head 31 and the magnetic tape 12 will be more preferable in view of reducing damages on the tape, but too low contact pressure may degrade the blocking property against the air flow, which may undesirably increase the spacing. It is therefore necessary to set an optimum radius of curvature of the bevel planes 31d.

Figure 12:
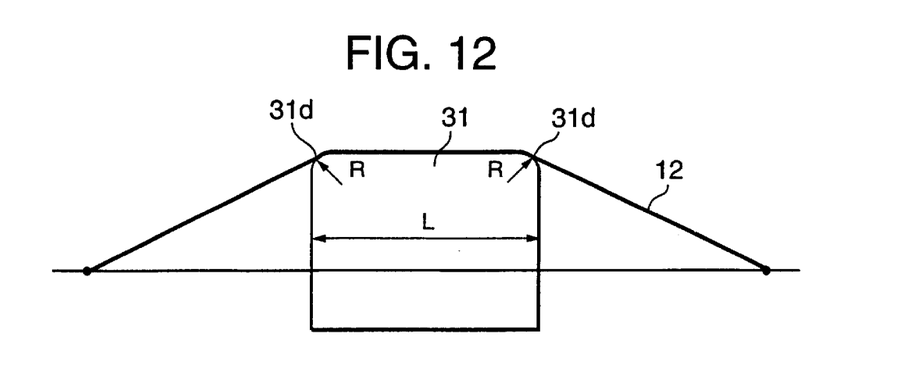
FIG. 12 is a side view showing a status of contact between a magnetic tape and a magnetic head having a flat slide-contact plane and curved bevel planes.

More specifically, it is preferable to satisfy a relation below:

$$0 < 2R/L \leq 0.3$$

where L represents a length of the magnetic head 31 in the running direction of the magnetic tape, and R represents a radius of curvature of the bevel plane 31d as illustrated in FIG. 12. The curved bevel planes 31d on both ends may have the same radius of curvature or may have different radius of curvature if only they satisfy the above-cited relation. Through provision of the curved bevel planes 31d to the magnetic head 31 so that 2R/L is defined within the above range, the contact pressure applied to the magnetic tape 12 is successfully dispersed while keeping a proper spacing characteristic, which reduces damage on the tape. This is also advantageous in suppressing deformation of the magnetic head 31 due to abrasion. On the contrary, a case with 2R/L=0, that is, a case with no curved bevel planes 31d provided to the magnetic head 31, will fail in reducing the contact pressure applied to the magnetic tape 12, and a case with 2R/L>0.3 may degrade the contact status.

The above case desirably disperses the contact pressure applied to the magnetic tape 12, to thereby reduce damage on the tape. This is also advantageous in suppressing deformation of the magnetic head 31 due to abrasion.

A simulation was then carried out to investigate the contact pressure and spacing behaviors of the stationary head system provided with a magnetic head having the flat slide-contact plane and the curved bevel planes at both ends thereof along the tape run direction, while setting an angle of projection $\theta_1$ of 2°, a tape speed of 3 m/sec, and 2R/L of ranging from 0 to 0.4.

Figure 13:
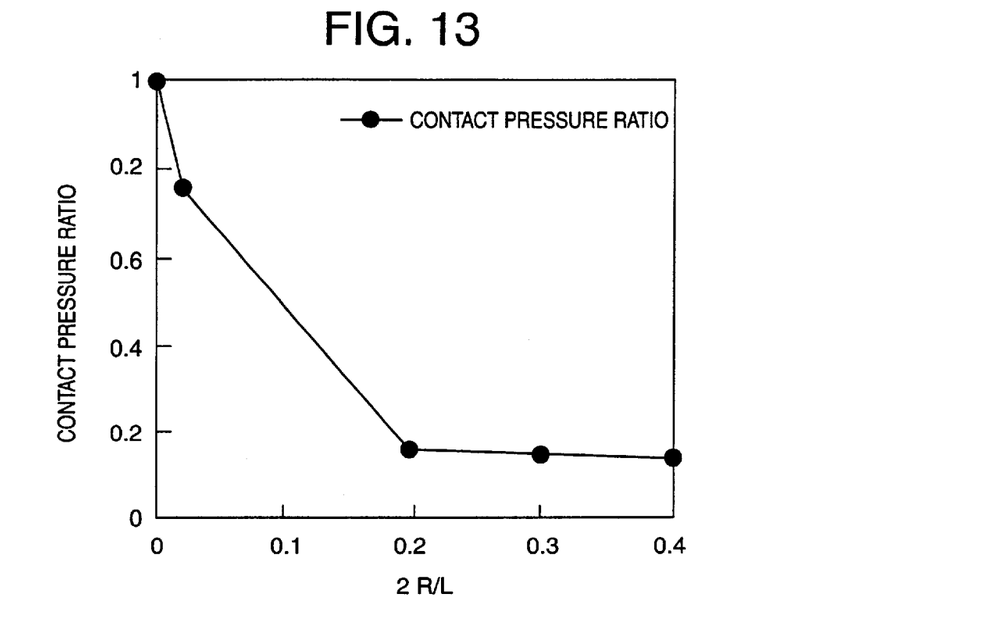
FIG. 13 is a graph showing a simulation result of behavioral characteristic of contact pressure depending on a radius of curvature of the bevel planes.
Figure 14:
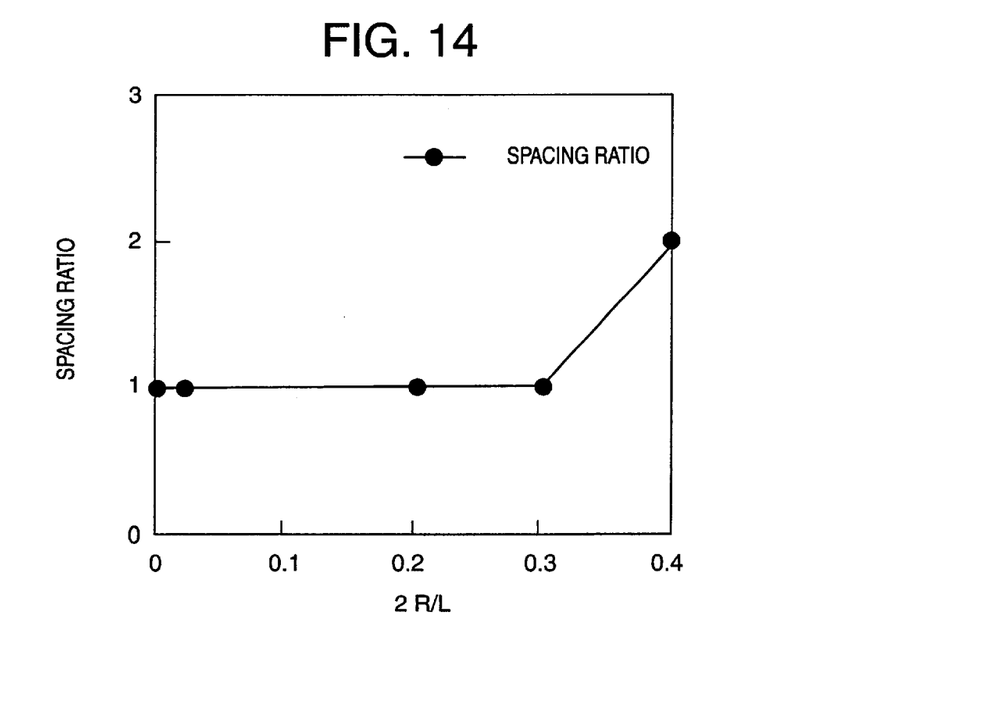
FIG. 14 is a graph showing a simulation result of behavioral characteristic of spacing ratio depending on the radius of curvature of the bevel planes.

Resultant contact pressure and spacing behaviors are shown in FIGS. 13 and 14, respectively. Note that the results shown in FIGS. 13 and 14 are expressed by a ratio assuming the contact pressure and spacing observed for the magnetic head having no bevel planes (2R/L=0) as 1, respectively.

As clearly known from FIG. 13, the contact pressure decreases as 2R/L increases from 0 to 0.2, that is, the radius of curvature of the bevel planes increases. The contact pressure was kept lower than that for the case with no bevel planes even 2R/L exceeds 0.2.

As clearly known from FIG. 14, the spacing ratio was kept constant for 2R/L ranging from 0 to 0.3. The spacing ratio, however, increased when 2R/L exceeded 0.3.

From such investigation results, it was made clear that damage on the magnetic tape 12 can further be reduced while ensuring a proper contact between the magnetic head 31 and the magnetic tape 12, and that the magnetic tape 12 can be improved in the durability, if the curved bevel planes 31d are provided at both ends of the slide-contact plane 31a of the magnetic head 31 so that the relation of $0<2R/L\leqq 0.3$ is satisfied.

The magnetic head 31 having the flat slide-contact plane 31a and curved bevel planes 31d as shown in FIG. 11 can be fabricated by chamfering the edge portions 11b of the magnetic head 11 having the flat slide-contact plane 11a as shown in FIG. 5. It is also allowable that the magnetic head 31 having the curved bevel planes 31d can preliminarily be fabricated in an integrated manner by molding so that the curved bevel planes 31d are formed on both sides of the flat slide-contact plane 31a. It is still also allowable that the magnetic head 31 having the curved bevel planes 31d can be fabricated by bonding the magnetic head 11 having an approximately rectangular shape as shown in FIG. 5 and a pair of units having planes corresponded to the curved bevel planes 31d, so that the magnetic head 11 is held at both sides of the edge portions 11b by the pair of units.

In the stationary head system shown in FIG. 11, air entrainment into the space between the slide-contact plane 31a of the magnetic head 31 and the magnetic tape 12 during tape running can be blocked by the curved bevel planes 31d, and the spacing during the tape running is minimized by the flatness of the slide-contact plane 31a. Moreover, provision of the curved bevel planes 31d at both ends of the slide-contact plane 31a along the tape run direction is advantageous in that dispersing the contact pressure between the magnetic tape 12 and the magnetic head 31, which reduces damages on the tape and suppresses deformation of the magnetic head 31 due to abrasion. Accordingly, the stationary head system can ensure stable signal recording/reproduction while successfully ensuring a proper contact between the magnetic head 31 and the magnetic tape 12.

The stationary head type magnetic recording/reproducing system shown in FIG. 11 is also advantageous in that the spacing between the magnetic head 31 and the magnetic tape 12 becomes smaller as the tape speed grows faster. Accordingly, the stationary head system can attain high recording density while successfully ensuring a proper contact between the magnetic tape 31 and the magnetic head 11.

While the above description dealt with a magnetic head having a flat bevel plane or a curved bevel plane provided at both ends of a flat slide-contact plane, the present invention is by no means limited thereto. For example, the stationary head system according to the present invention may also have a constitution shown in FIG. 15, which comprises a magnetic head 41, a guide 3 provided in a depth-wise direction and on a tape enter side of the magnetic head 41, a guide 4 provided on an extension line of a slide-contact plane 41a on a tape-exit side, where the slide-contact plane 41a of the magnetic head 41 is flat, and the slide-contact plane 41a is further provided with a flat bevel plane 41c on the tape-enter side of the magnetic head 41. In the stationary head system shown in FIG. 15, the magnetic tape 12 is allowed to run unidirectionally from the side of the bevel plane 41c towards the slide-contact plane 41a of the magnetic head 41, as indicated by an arrow Z.

Figure 15:
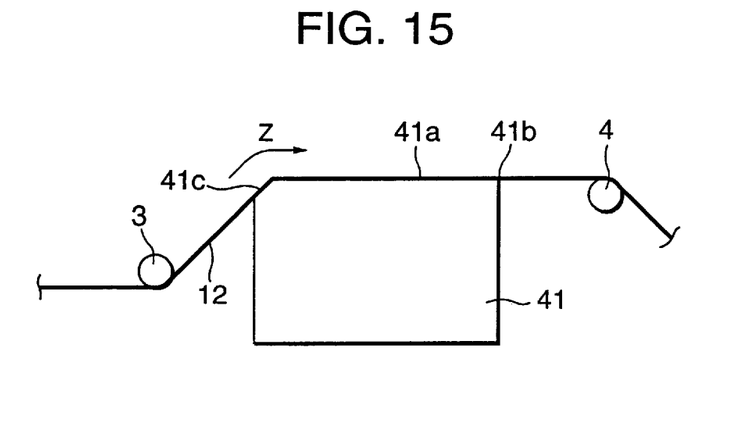
FIG. 15 is a side view showing a status of contact between a magnetic tape and a magnetic head having a flat slide-contact plane and a flat bevel plane on a tape enter side.

In the stationary head system shown in FIG. 15, air entrainment into a space between the slide-contact plane 41a of the magnetic head 41 and the magnetic tape 12 during tape running can be blocked by the bevel plane 41c, and the spacing during the tape running is minimized by the flatness of the slide-contact plane 41a. Moreover, provision of the flat bevel plane 41c at least on the tape enter side of the slide-contact plane 41a is advantageous in that dispersing the contact pressure between the magnetic tape 12 and the magnetic head 41, which reduces damages on the tape and suppresses deformation of the magnetic head 41 due to abrasion. Accordingly, the stationary head system can ensure stable signal recording/reproduction while successfully ensuring a proper contact between the magnetic head 41 and the magnetic tape 12.

The stationary head type magnetic recording/reproducing system shown in FIG. 15 is also advantageous in that the spacing between the magnetic head 41 and the magnetic tape 12 becomes smaller as the tape speed grows faster. Accordingly, the present invention can successfully achieve a high recording density while keeping a proper contact between the magnetic head 41 and the magnetic tape 12.

The stationary head system shown in FIG. 15 may have one or more additional magnetic heads between the magnetic head 41 and the guide 4.

The relation between the angle of projection $\theta_1$ and angle of inclination $\theta_2$ for the stationary head system shown in FIG. 15 may be approximately same with that for the magnetic head 11 previously shown in FIG. 6.

Figure 16:
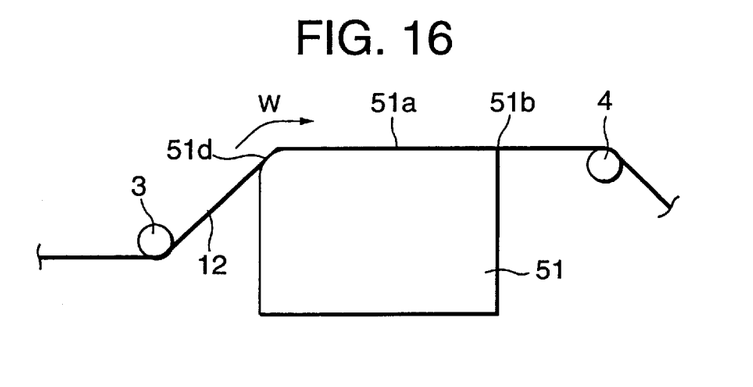
FIG. 16 is a side view showing a status of contact between a magnetic tape and a magnetic head having a flat slide-contact plane and a curved bevel plane on the tape enter side.

The stationary head system according to the present invention may also have a constitution shown in FIG. 16, which comprises a magnetic head 51, a guide 3 provided in a depth-wise direction and on a tape enter side of the magnetic head 51, a guide 4 provided on an extension line of a slide-contact plane 51a on a tape exit side, where the slide-contact plane 51a of the magnetic head 51 is flat, and the slide-contact plane 51a is further provided with a curved bevel plane 51d on the tape enter side of the magnetic head 51. In the stationary head system shown in FIG. 16, the magnetic tape 12 is allowed to run unidirectionally from the side of the bevel plane 51d towards the slide-contact plane 51a of the magnetic head 51, as indicated by an arrow W.

In the stationary head system shown in FIG. 16, air entrainment into a space between the slide-contact plane 51a of the magnetic head 51 and the magnetic tape 12 during tape running can be blocked by the curved bevel plane 51d, and the spacing during the tape running is minimized by the flatness of the slide-contact plane 51a. Moreover, provision of the curved bevel plane 51d at least on the tape enter side of the slide-contact plane 51a is advantageous in that dispersing the contact pressure between the magnetic tape 12 and the magnetic head 51, which reduces damages on the tape and suppresses deformation of the magnetic head 51 due to abrasion. Accordingly, the stationary head system can ensure stable signal recording/reproduction while successfully ensuring a proper contact between the magnetic head 51 and the magnetic tape 12.

The stationary head type magnetic recording/reproducing system shown in FIG. 16 is also advantageous in that the spacing between the magnetic head 51 and the magnetic tape 12 becomes smaller as the tape speed grows faster. Accordingly, the present invention can successfully achieve a high recording density while keeping a proper contact between the magnetic head 51 and the magnetic tape 12.

The stationary head system shown in FIG. 16 may have one or more additional magnetic heads between the magnetic head 51 and the guide 4.

The relation between a length L of the magnetic head in the running direction of the magnetic tape and a radius of curvature R of the bevel plane for the stationary head system shown in FIG. 16 may be approximately same with that for the magnetic head 21 previously shown in FIG. 12.

While the above description dealt with the stationary head system having a single magnetic head between a pair of guides 3 and 4, the present invention is by no means limited thereto. For example, the stationary head system according to the present invention may also have a constitution shown in FIG. 17, which comprises two magnetic heads (magnetic heads 61 and 71), and the guides 3 and 4. The guides 3 and 4 are respectively provided at a side of each of the magnetic heads 61 and 71 other than that facing the other in the depth-wise direction. The magnetic head 61 has a flat slide-contact plane 61a and a flat bevel plane 61c at a corner between the slide-contact plane 61a and a side plane facing the guide 3. The magnetic head 71 has a flat slide-contact plane 71a and a flat bevel plane 71c at a corner between the slide-contact plane 71a and a side plane facing the guide 4.

Figure 17:
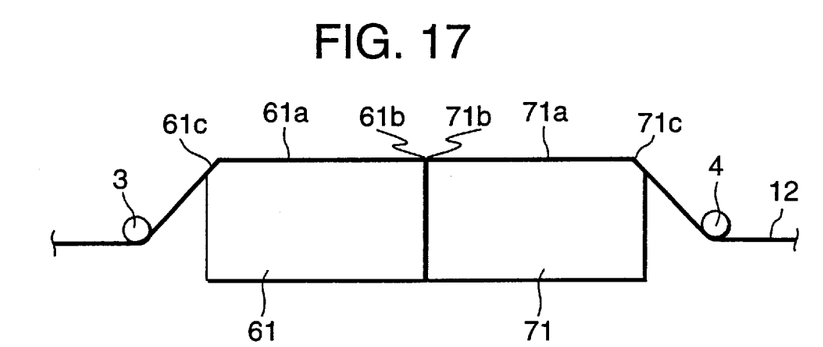
FIG. 17 is a side view showing a status of contact between a magnetic tape and two magnetic heads respectively having a flat slide-contact plane and a flat bevel plane on sides where guide means are provided.

In the stationary head system shown in FIG. 17, air entrainment into a space between the magnetic tape 12 and the slide-contact plane 61a or the slide-contact plane 71a during tape running can be blocked by the bevel plane 61c or 71c, and the spacing during the tape running is minimized by the flatness of the slide-contact plane 61a and 71a. Moreover, provision of the bevel planes 61c and 71c is advantageous in that dispersing the contact pressure between the magnetic tape 12 and the magnetic head 61 or 71, which reduces damages on the tape and suppresses deformation of the magnetic head 61 or 71 due to abrasion. Accordingly, the stationary head system can ensure stable signal recording/reproduction while successfully ensuring a proper contact of the magnetic tape 12 with the magnetic head 61 or 71.

The stationary head type magnetic recording/reproducing system shown in FIG. 17 is also advantageous in that the spacing between the magnetic tape 12 and the magnetic head 61 or 71 becomes smaller as the tape speed grows faster. Accordingly, the present invention can successfully achieve a high recording density while keeping a proper contact of the magnetic tape 12 with the magnetic head 61 or 71.

The stationary head system shown in FIG. 17 is preferably designed so as to allow the magnetic tape 12 to run in forward and reverse directions relative to the magnetic heads 61 and 71. This approximately doubles the information recording capacity as compared with that of a stationary head system in which the magnetic tape runs only unidirectionally. Accordingly, the present invention can achieve increase both in transmission rate and recording capacity of the magnetic tape at the same time, to thereby build a stationary head system with a high recording density never achieved before.

The relation between the angle of projection $\theta_1$ and angle of inclination $\theta_2$ for the stationary head system shown in FIG. 17 may be approximately same with that for the magnetic head 11 previously shown in FIG. 6.

While FIG. 17 typically showed the stationary head system having flat bevel planes, those having curved bevel planes are also allowable. In this case, the relation between a length L of the magnetic head in the tape run direction of the magnetic tape and a radius of curvature R of the curved bevel plane for the stationary head system based on that shown in FIG. 17 and modified in such a way may be approximately same with that for the magnetic head 21 previously shown in FIG. 12.

The stationary head system shown in FIG. 17 may have one or more additional magnetic heads between the magnetic heads 61 and 71.

Although the invention has been described in its preferred form with a certain degree of particularity, obviously many changes and variations are possible therein. It is therefore to be understood that the present invention may be practiced otherwise than as specifically described herein without departing from the scope and the sprit thereof.

What is claimed is:

1. A magnetic recording/reproducing system, comprising:
   a magnetic head responsible for recording/reproduction of signal to and from a running magnetic tape; and
   a pair of guide means provided in a depth-wise direction and on both sides of said magnetic head,
   wherein,
   said magnetic head has a flat slide-contact plane which comes into contact with the magnetic tape, and performs recording/reproduction of signal while pressurizing the magnetic tape as it runs while being guided by said guide means,
   said magnetic head has bevel planes at both ends of said slide-contact plane along a running direction of the magnetic tape,
   said bevel planes are flat,
   an angle of inclination $\theta_2$ resides within a range exceeding 70% and less than 300% of an angle of projection $\theta_1$,
   said angle of projection $\theta_1$ is defined as an acute angle out of angles formed between said slide-contact plane and the magnetic tape extending towards said guide means, and
   said angle of inclination $\theta_2$ is defined as an acute angle out of angles formed between said slide-contact plane and said bevel plane.

2. The magnetic recording/reproducing system as claimed in claim 1, wherein the magnetic tape runs in forward and reverse directions relative to said magnetic head.

3. A magnetic recording/reproducing system, comprising:
   a magnetic head responsible for recording/reproduction of signal to and from a running magnetic tape; and
   a pair of guide means provided in a depth-wise direction and on both sides of said magnetic head,
   wherein,
   said magnetic head has a flat slide-contact plane which comes into contact with the magnetic tape, and performs recording/reproduction of signal while pressurizing the magnetic tape as it runs while being guided by said guide means,
   said magnetic head has bevel planes at both ends of said slide-contact plane along a running direction of the magnetic tape,
   said bevel plane is curved, and
   a relation of $$0 < 2R/L \leq 0.3$$

is satisfied, where L represents a length of the magnetic head in the running direction of the magnetic tape, and R represents a radius of curvature of said bevel plane.

4. The magnetic recording/reproducing system as claimed in claim 3, wherein the magnetic tape runs in forward and reverse directions relative to said magnetic head.

5. A magnetic recording/reproducing system, comprising:
   a magnetic head responsible for recording/reproduction of signal to and from a magnetic tape running unidirectionally;

a first guide means provided in a depth-wise direction on a tape enter side of said magnetic head; and a second guide means provided in the depth-wise direction on a tape exit side of said magnetic head, wherein, said magnetic head has a flat slide-contact plane which comes into contact with the magnetic tape, and performs recording/reproduction of signal while pressurizing the magnetic tape as it runs while being guided by said first and second guide means, said magnetic head has a bevel plane at an end of said slide-contact plane on the tape enter side, said bevel plane is flat, an angle of inclination $\theta_2$ resides within a range exceeding 70% and less than 300% of an angle of projection $\theta_1$, said angle of projection $\theta_1$ is defined as an acute angle out of angles formed between said slide-contact plane and the magnetic tape extending towards said first guide means on the tape enter side, and said angle of inclination $\theta_2$ is defined as an acute angle out of angles formed between said slide-contact plane and said bevel plane.

6. The magnetic recording/reproducing system as claimed in claim 5, further comprising at least one additional magnetic head on the tape exit side of said magnetic head.

7. A magnetic recording/reproducing system, comprising:

a magnetic head responsible for recording/reproduction of signal to and from a magnetic tape running unidirectionally;

a first guide means provided in a depth-wise direction on a tape enter side of said magnetic head; and a second guide means provided in the depth-wise direction on a tape exit side of said magnetic head, wherein, said magnetic head has a flat slide-contact plane which comes into contact with the magnetic tape, and performs recording/reproduction of signal while pressurizing the magnetic tape as it runs while being guided by said first and second guide means, said magnetic head has a bevel plane at an end of said slide-contact plane on the tape enter side, said bevel plane is curved, and a relation of $$0 < 2R/L \leq 0.3$$

is satisfied, where L represents a length of said magnetic head in a running direction of the magnetic tape, and R represents a radius of curvature of said bevel plane.

8. The magnetic recording/reproducing system as claimed in claim 7, further comprising at least one additional magnetic head on the tape exit side of said magnetic head.

9. A magnetic recording/reproducing system, comprising:

a first magnetic head and a second magnetic head responsible for recording/reproduction of signal to and from a running magnetic tape; and a pair of guide means provided in a depth-wise direction and at sides of said first and second magnetic heads other than those facing each other, wherein, each of said first and second magnetic heads has a flat slide-contact plane which comes into contact with the magnetic tape, each of said first and second magnetic heads has a bevel plane at a corner between said slide-contact plane and a side plane facing each of said guide means, said bevel planes are flat, an angle of inclination $\theta_2$ resides within a range exceeding 70% and less than 300% of an angle of projection $\theta_1$, said angle of projection $\theta_1$ is defined as an acute angle out of angles formed between said slide-contact plane and the magnetic tape extending towards said guide means, and said angle of inclination $\theta_2$ is defined as an acute angle out of angles formed between said slide-contact plane and said bevel plane.

10. The magnetic recording/reproducing system as claimed in claim 9, further comprising at least one additional magnetic head between said first and second magnetic heads.

11. The magnetic recording/reproducing system as claimed in claim 9, wherein the magnetic tape runs in forward and reverse directions relative to said first and second magnetic heads.

12. A magnetic recording/reproducing system, comprising:

a first magnetic head and a second magnetic head responsible for recording/reproduction of signal to and from a running magnetic tape; and a pair of guide means provided in a depth-wise direction and at sides of said first and second magnetic heads other than those facing each other, wherein, each of said first and second magnetic heads has a flat slide-contact plane which comes into contact with the magnetic tape, each of said first and second magnetic heads has a bevel plane at a corner between said slide-contact plane and a side plane facing each of said guide means, said bevel plane is curved, and a relation of $$0 < 2R/L \leq 0.3$$

is satisfied, where L represents a length of each magnetic head in a running direction of the magnetic tape, and R represents a radius of curvature of said bevel plane.

13. The magnetic recording/reproducing system as claimed in claim 12, further comprising at least one additional magnetic head between side first and second magnetic heads.

14. The magnetic recording/reproducing system as claimed in claim 12, wherein the magnetic tape runs in forward and reverse directions relative to said first and second magnetic heads.

* * * * *